(12) United States Patent
Garcia (10) Patent No.: US 10,694,738 B2
(45) Date of Patent: Jun. 30, 2020

(54) PERSONAL PROTECTIVE FIELD GENERATOR

(71) Applicant: Freddy Rivera Garcia, Middleburg, FL (US)

(72) Inventor: Freddy Rivera Garcia, Middleburg, FL (US)

( * ) Notice: Subject to any disclaimer, the term of this patent is extended or adjusted under 35 U.S.C. 154(b) by 416 days.

(21) Appl. No.: 15/478,194

(22) Filed: Apr. 3, 2017

(65) Prior Publication Data

US 2017/0280702 A1 Oct. 5, 2017

Related U.S. Application Data

(60) Provisional application No. 62/317,248, filed on Apr. 1, 2016.

(51) Int. Cl.
*A01M 29/28* (2011.01)

(52) U.S. Cl.
CPC .................................... *A01M 29/28* (2013.01)

(58) Field of Classification Search
CPC .............................. A01M 29/28; B08B 17/02
USPC .......................................................... 361/231
See application file for complete search history.

(56) References Cited

U.S. PATENT DOCUMENTS

| | | | | |
|---|---|---|---|---|
| 4,563,759 A | * | 1/1986 | Hayakawa | A01M 29/18 340/384.2 |
| 5,896,696 A | * | 4/1999 | Stokes | A01M 1/226 43/124 |
| 5,952,925 A | * | 9/1999 | Secker | A01K 15/02 119/859 |
| 6,711,360 B1 | * | 3/2004 | Wu | H03B 21/00 327/175 |
| 6,882,594 B1 | * | 4/2005 | Pujolas | A01M 29/28 367/139 |
| 9,504,233 B2 | * | 11/2016 | Stephens | A01K 15/021 |
| 2007/0137096 A1 | * | 6/2007 | Ragon | A01M 1/02 43/132.1 |
| 2017/0219235 A1 | * | 8/2017 | Connell | G05D 23/1927 |
| 2017/0280702 A1 | * | 10/2017 | Garcia | A01M 29/28 |

* cited by examiner

*Primary Examiner* — Kevin J Comber (57) ABSTRACT

A personal protective field generator utilizes at least one pulse generator to generate one or more carrier signals, which are then modulated by a signal modulator unit and output through a field transmission unit in order to create a personal protective field around a user or other object through the "skin effect," a byproduct of high frequency pulses at specific voltages. The personal protective field created through the skin effect can repel unwanted contact with the user such as insects, dust, chemical vapors or other environmental hazards.

1 Claim, 10 Drawing Sheets

PERSONAL PROTECTIVE FIELD GENERATOR

The current application claims a priority to the U.S. Provisional Patent application Ser. No. 62/317,248 filed on Apr. 1, 2016. The current application is filed on Apr. 3, 2017, wherein Apr. 1, 2017 and Apr. 2, 2017 were on a weekend.

FIELD OF THE INVENTION

The present invention relates generally to wearable technology. More particularly, the present invention relates to personal protection through signal generation.

BACKGROUND OF THE INVENTION

Insects are generally considered as pests, and their presence is typically undesired, especially in areas of warm and humid climates where most of the insect population resides. A large number of products are on the market today, geared towards repelling insects, and most achieve this through chemical means which can harm the environment. It is an object of the present invention to provide an insect repellent that offers far better protection through non-conventional means.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced without the implementation of some features as they are described. It should be understood that some details have not been described in detail in order to not unnecessarily obscure focus of the invention.

The present invention is a personal protective field generator. In various embodiments, the present invention may be configured to generate a protective field around any object or user in contact with the device which would then be configured to repel a wide range of undesirable contact with the wearer or a wide variety of vegetation, such as, but not limited to, insects, dust, or chemicals. The protective field generated by the present invention is conducted through the user's skin, by using a byproduct of high frequency known as the "skin effect." The present invention utilizes a carrier signal such as, but not limited to, multiple high frequency pulses at high or low voltages to generate the "skin effect," creating a field of sorts that can radiate outwards from the top layer of the human skin. Due to certain criteria being met, the "skin effect" can be manipulated to generate an even field around the human body, deterring insects, dust particles, harmful chemical vapors or other airborne hazards from coming into contact with the user.

The specific components and combinations of components of the present invention may vary, but in general, the present invention is a special printed circuit board incorporating resistors, diodes, capacitors, coils, integrated circuits (ICs), wires, a casing, insulation, high voltage insulation, a neon bulb, one or more light-emitting diodes (LEDs), straps, plates, and programming. These are assembled in a fashion that allows the production of programmed pulses and/or frequencies exhibiting the "skin effect" which is a natural effect of higher frequencies. These are then generated in part of the coil and IC's then re-injected into another portion of the coil that is terminated to a plate touching the human skin of a user, causing this "skin effect" to be transmitted throughout an entire body to create a shield against insects or other hazards. This effect is illustrated in FIGS. 1-4, showing a skin surface 1 of an operator, an exemplary insect 2, a positive charge field 3, and a negative charge field 4 as an example of the personal protective field.

Figure 1:
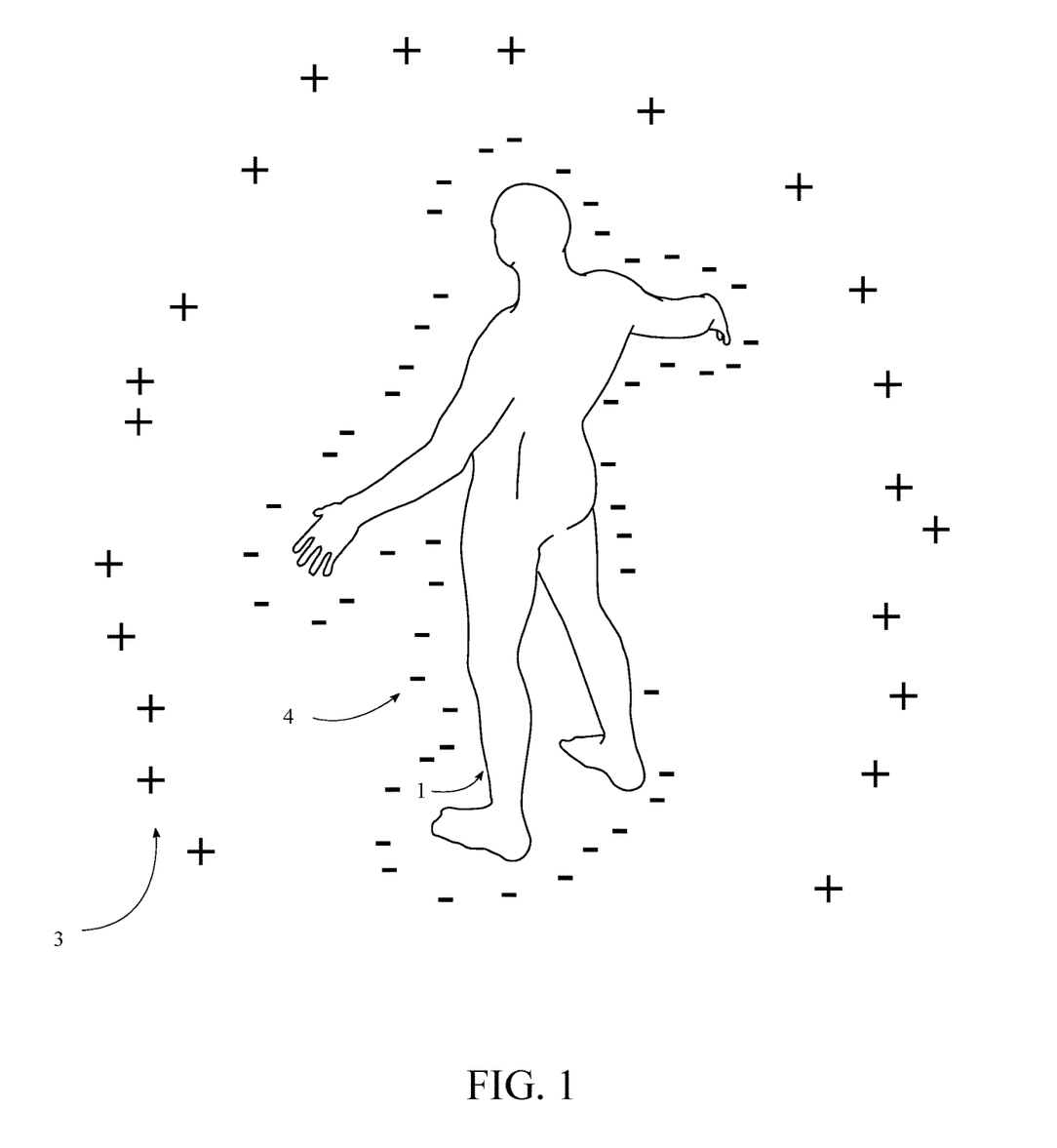
FIG. 1 is a perspective view illustration depicting the "skin effect."
Figure 2:
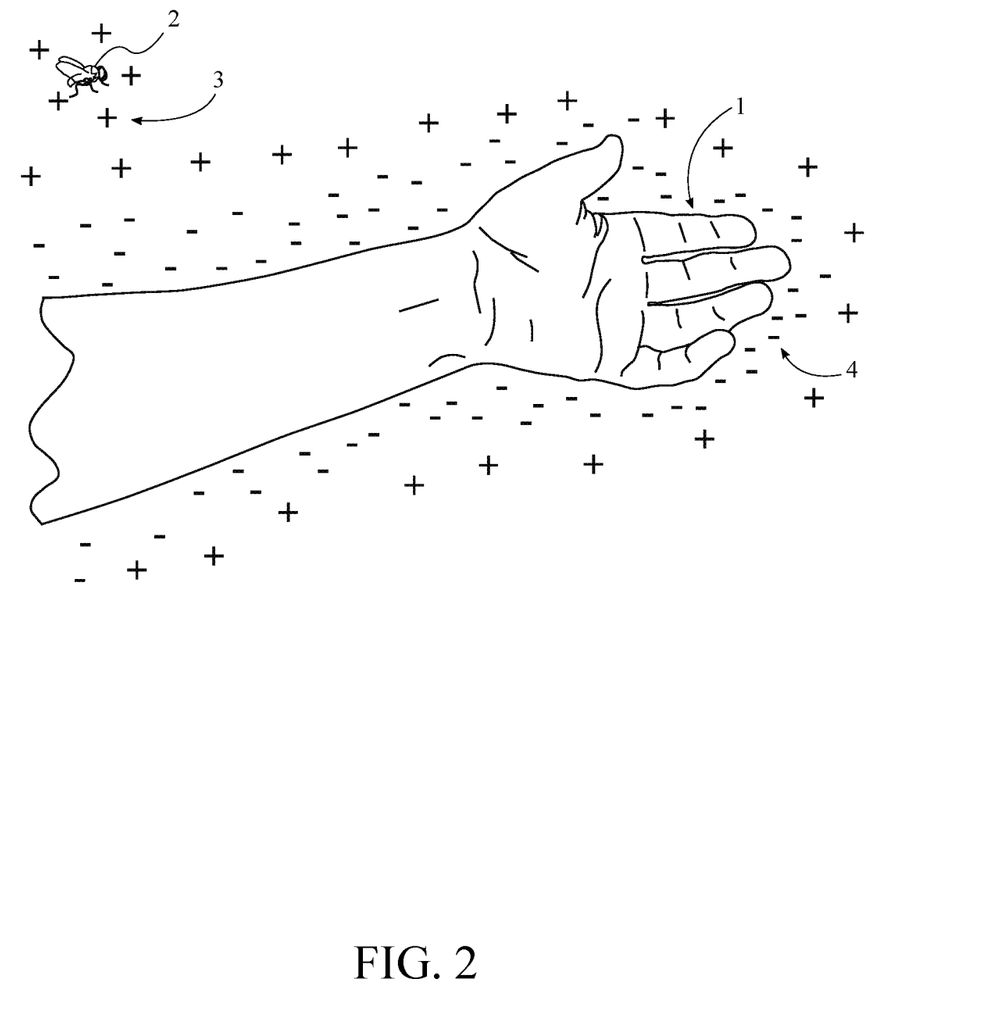
FIG. 2 is an illustration of the present invention in use using the "skin effect" to repel an insect.
Figure 3:
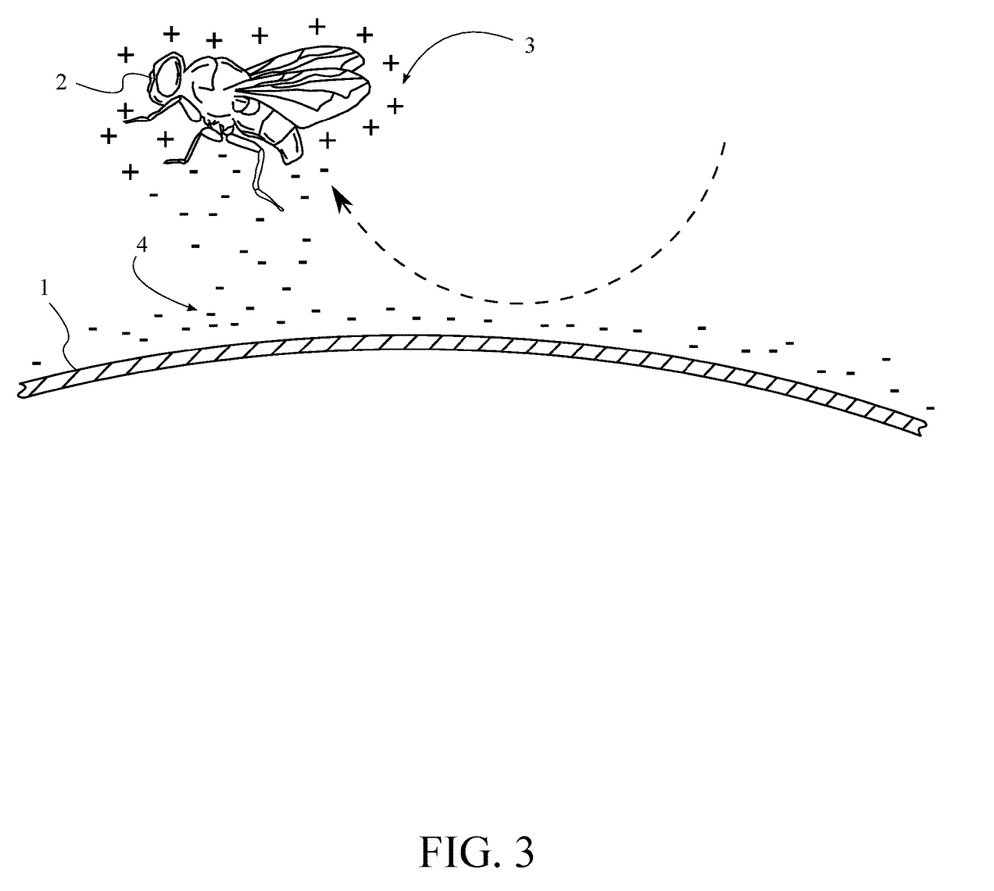
FIG. 3 is a further illustration of the present invention in use using the "skin effect" to repel an insect.
Figure 4:
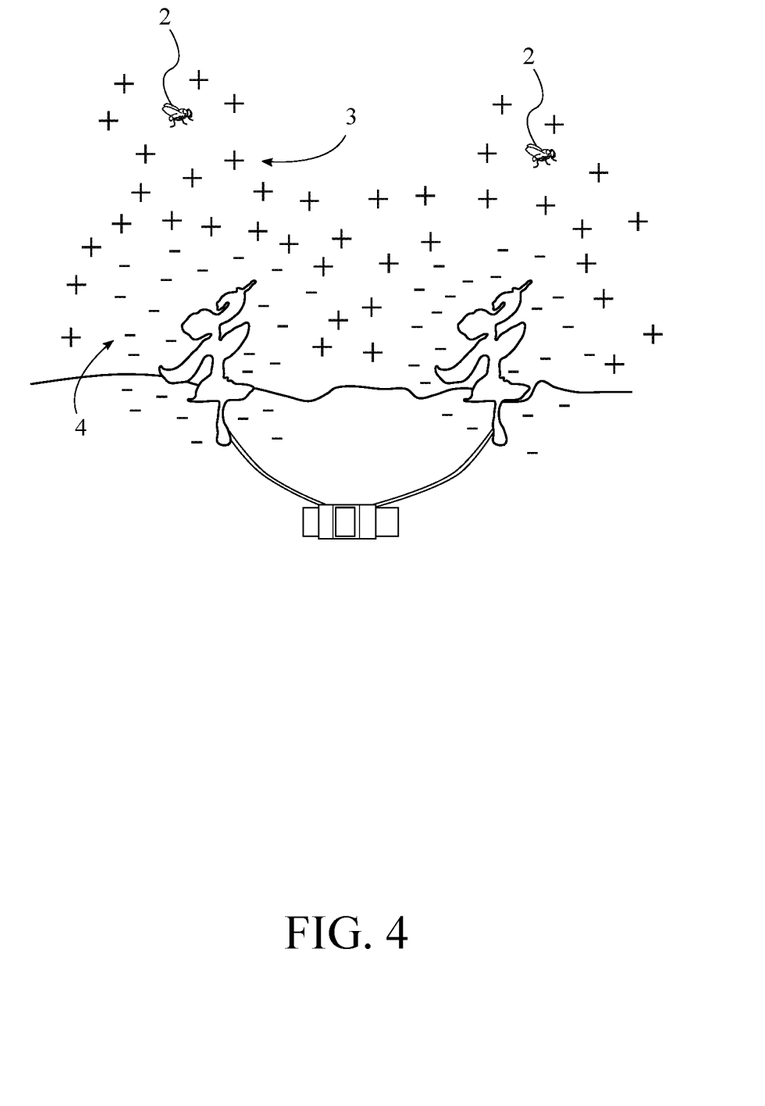
FIG. 4 is a further illustration of the present invention in use using the "skin effect" to repel insects from plants.
Figure 5:
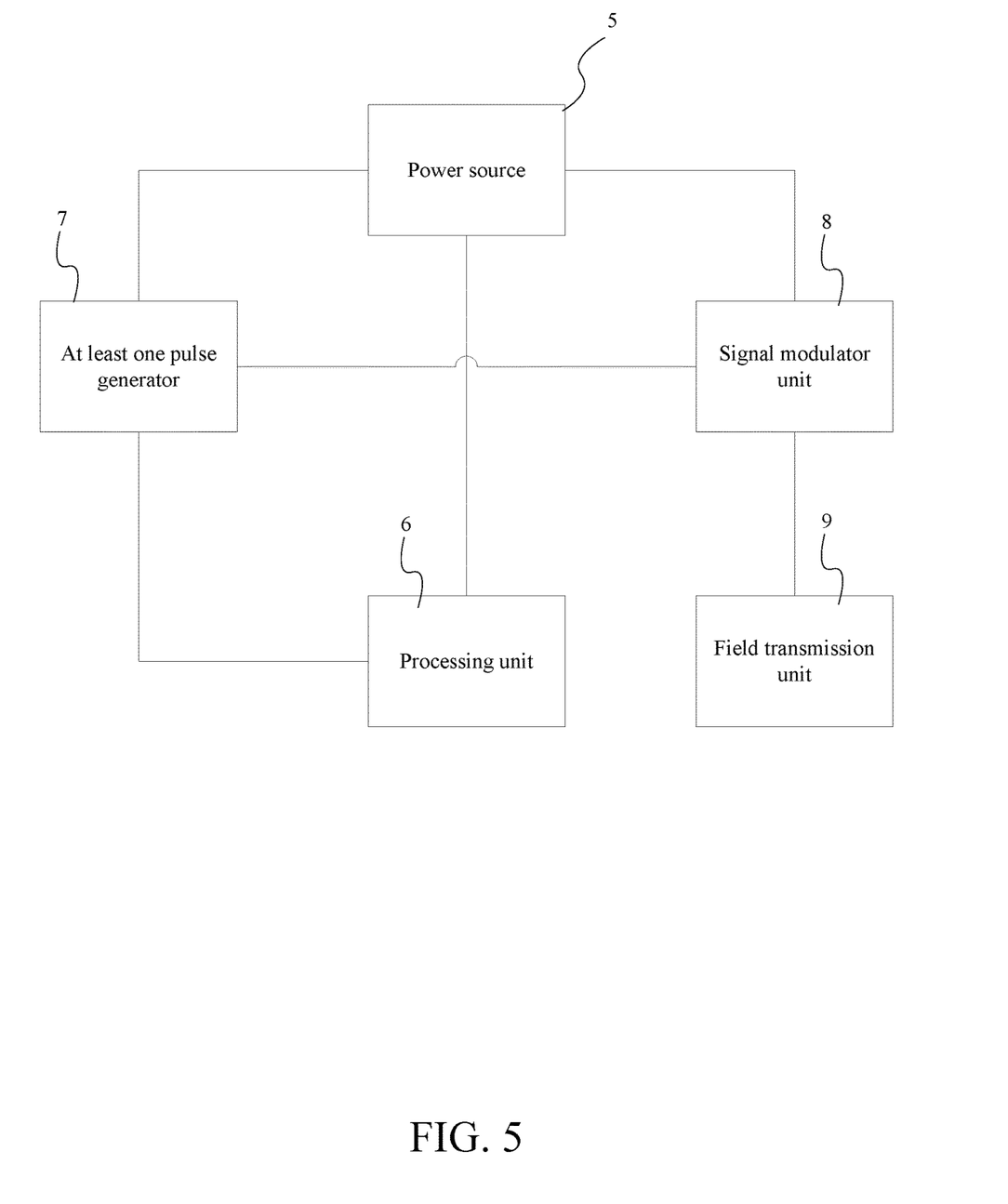
FIG. 5 is a general electrical diagram for the components of the present invention.

Referring to FIG. 5, the preferred embodiment of the present invention comprises a power source 5, a processing unit 6, at least one pulse generator 7, a signal modulator unit 8, and a field transmission unit 9. The power source 5 is electrically connected to the at least one pulse generator 7 and the signal modulator unit 8. At least one pulse generator 7 is electronically connected to the signal modulator unit 8. Each of the at least one pulse generator 7 is configured to generate a carrier signal, and the signal modulator unit 8 is configured to combine the carrier signal of each pulse generator into a combined carrier signal and subsequently output the combined carrier signal to the field transmission unit 9.

The power source 5 may be any source of electrical power which provides the necessary power for the present invention to function. For example, the power source 5 may be, but is not limited to, one or multiple batteries, battery packs or battery banks, or the power source 5 may comprise a wired connection 13 to an external power source 5, or the power source 5 may comprise electrical generation means such as a solar cell or a generator unit.

The processing unit 6 may be any electrical circuitry component or combination of components such as, but not limited to, specially printed circuit board, capacitors, resistors, wiring, integrated circuits, microprocessors, microcontrollers, or any other electronic components that facilitate the execution of computer-executable instructions stored on a non-transitory computer-readable medium. The processing unit 6 may be configured through any programming language or machine code to execute any electronic instructions necessary to enable the present invention to function as desired.

Figure 6:
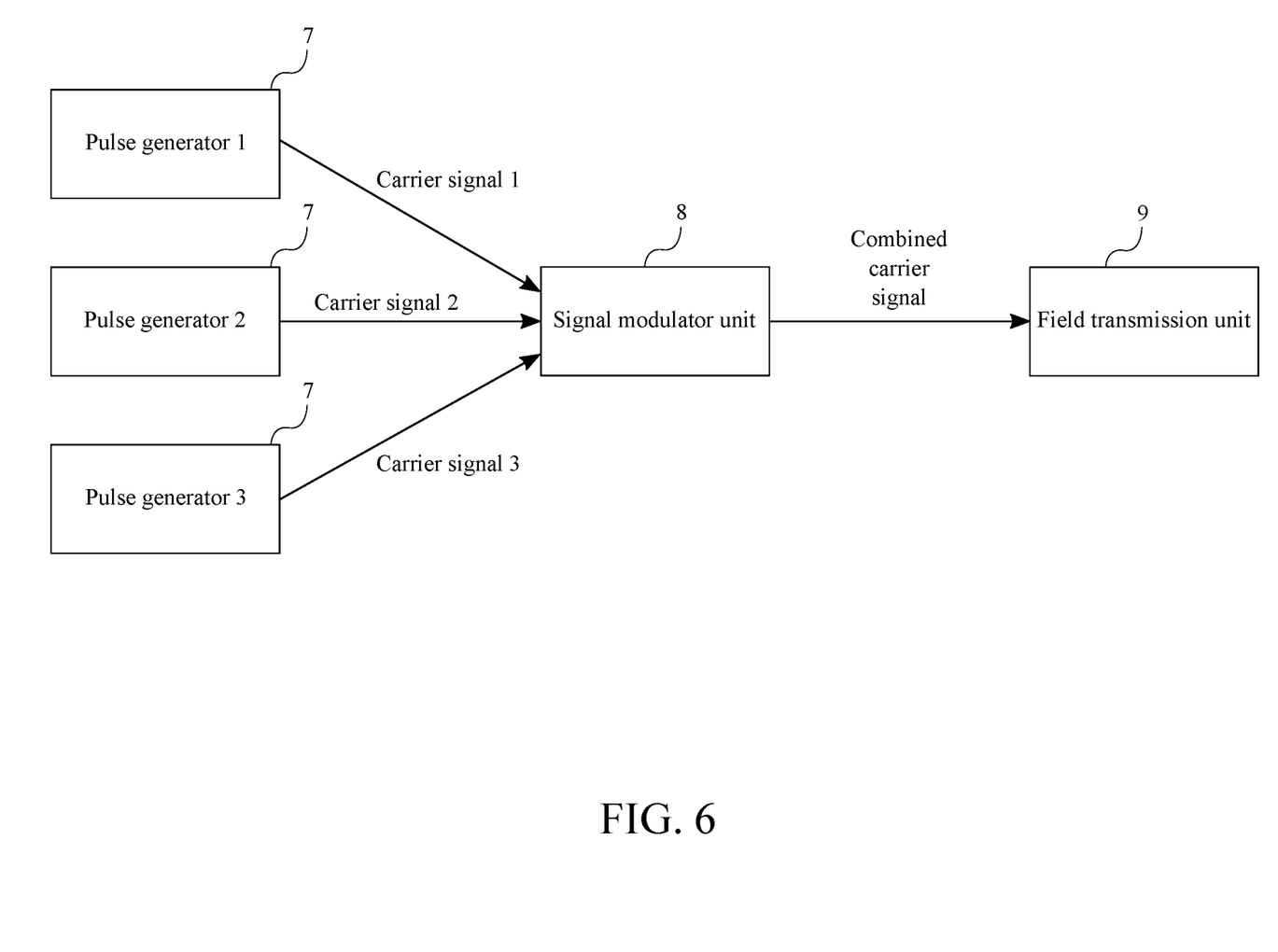
FIG. 6 is a depiction of carrier signal from multiple pulse generators being combined and output.

Each of the at least one pulse generator 7 is an electronic or mechanical device which is capable of producing a pulse, signal, vibration, or other effect in order to facilitate the creation of the personal protective field. It is contemplated that many variations of pulse generators may be utilized in various different specific applications of the present invention. For example, the nature of pulse generator or generators required to repel insects may differ from the pulse generator(s) required to repel dust. One or more pulse generators may be utilized as desired. Each pulse generator is configured to generate a carrier signal. In one embodiment of the present invention, the at least one pulse generator 7 is a multiple frequency pulse generator. The carrier signal for each pulse generator is sent to the signal modulator unit 8, which combines the carrier signals according to various logical specifications in order to create a combined carrier signal. The combined carrier signal is then output from the signal modulator unit 8 to the field transmission unit 9. An illustration of carrier signal generation and combination is shown in FIG. 6.

The field transmission unit 9 is a physical device which facilitates the combined carrier signal being conducted to the skin of a user. In one embodiment of the present invention, the field transmission unit 9 can be any material that can successfully conduct all desired signals with the least amount of loss. In one embodiment, the field transmission unit 9 comprises a metal plate.

Figure 7:
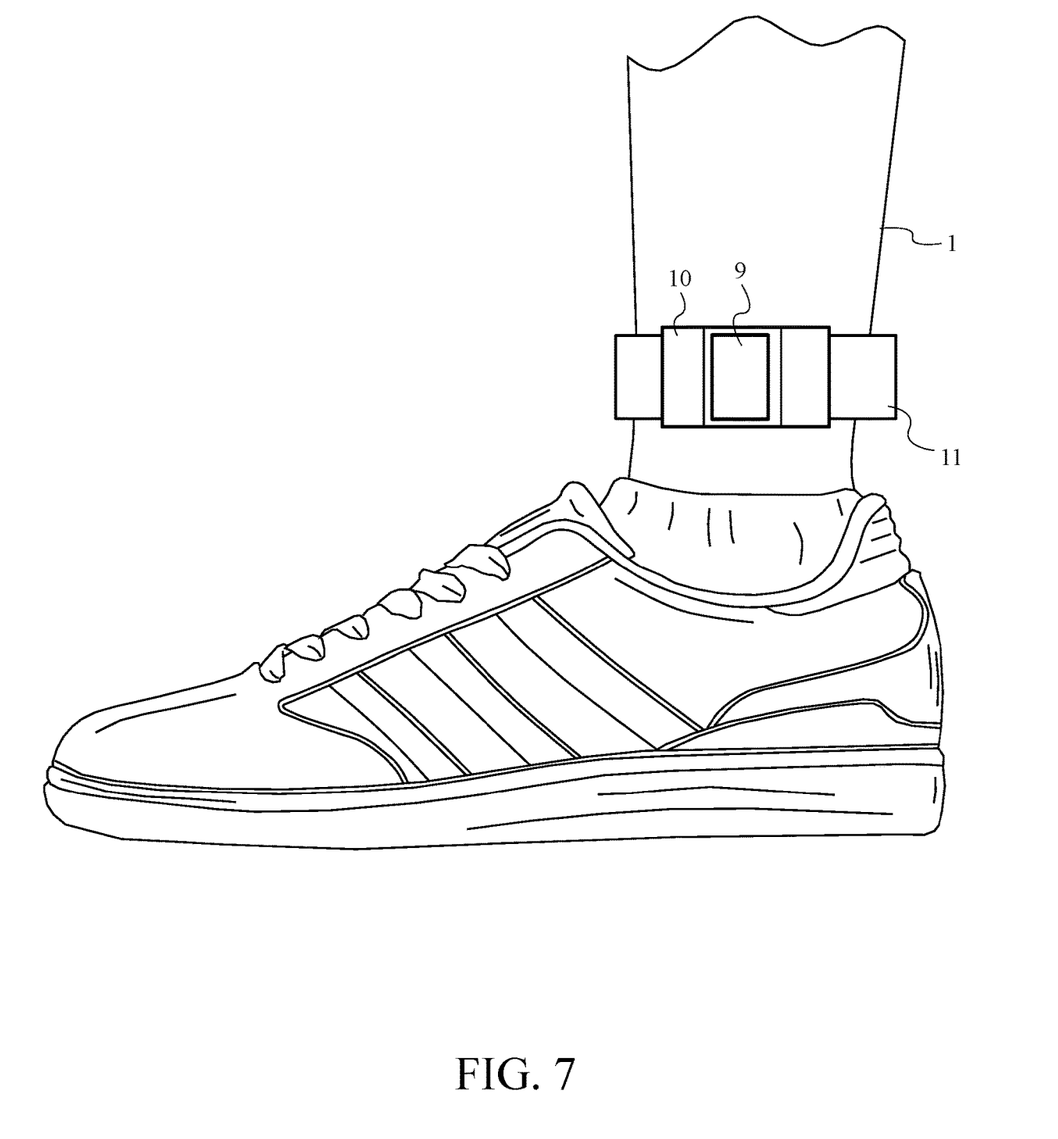
FIG. 7 is a side view of one exemplary embodiment of the present invention.
Figure 8:
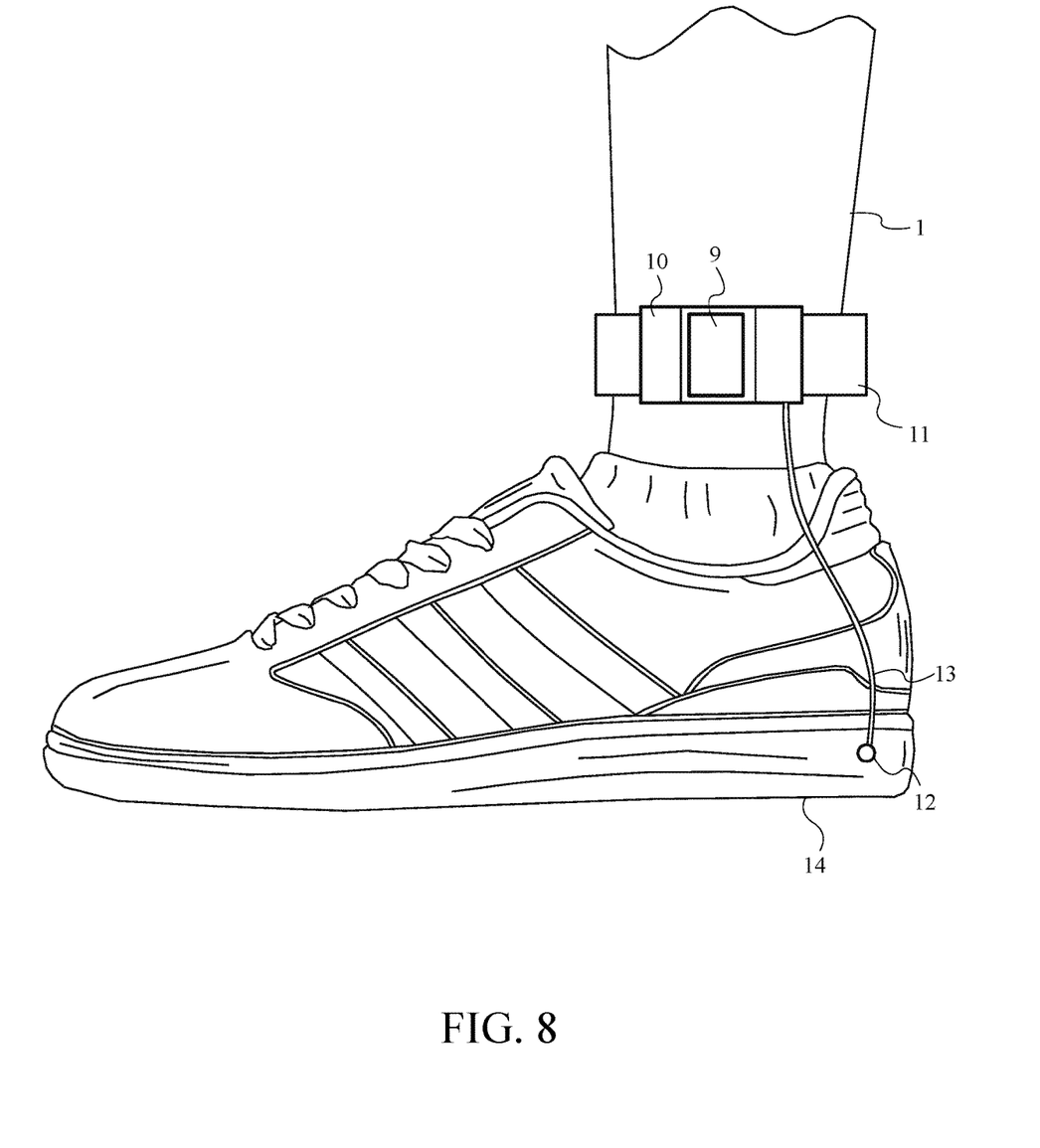
FIG. 8 is a side view of another exemplary embodiment of the present invention.

The preferred embodiment of the present invention comprises a means for attaching the present invention to a user. It is contemplated that many such means in many various embodiments may be utilized. A first exemplary embodiment of the present invention is shown in FIG. 7. In one embodiment, a housing 10 and a strap 11 are further comprised by the present invention. The power source 5, the processing unit 6, the at least one pulse generator 7, and the signal modulator unit 8 are positioned within the housing 10. The field transmission unit 9 is furthermore connected exterior to the housing 10 in order to come into contact with the user's skin surface 1. The strap 11 is connected exterior to the housing 10 and may be affixed around a user's arm, leg, or other body part in such a way that the field transmission unit 9 is in contact with the user's skin. A second exemplary embodiment is shown in FIG. 8. The secondary exemplary embodiment further comprises a pin 12 connected through a wired connection 13 to a shoe sole 14 of the user.

Figure 9:
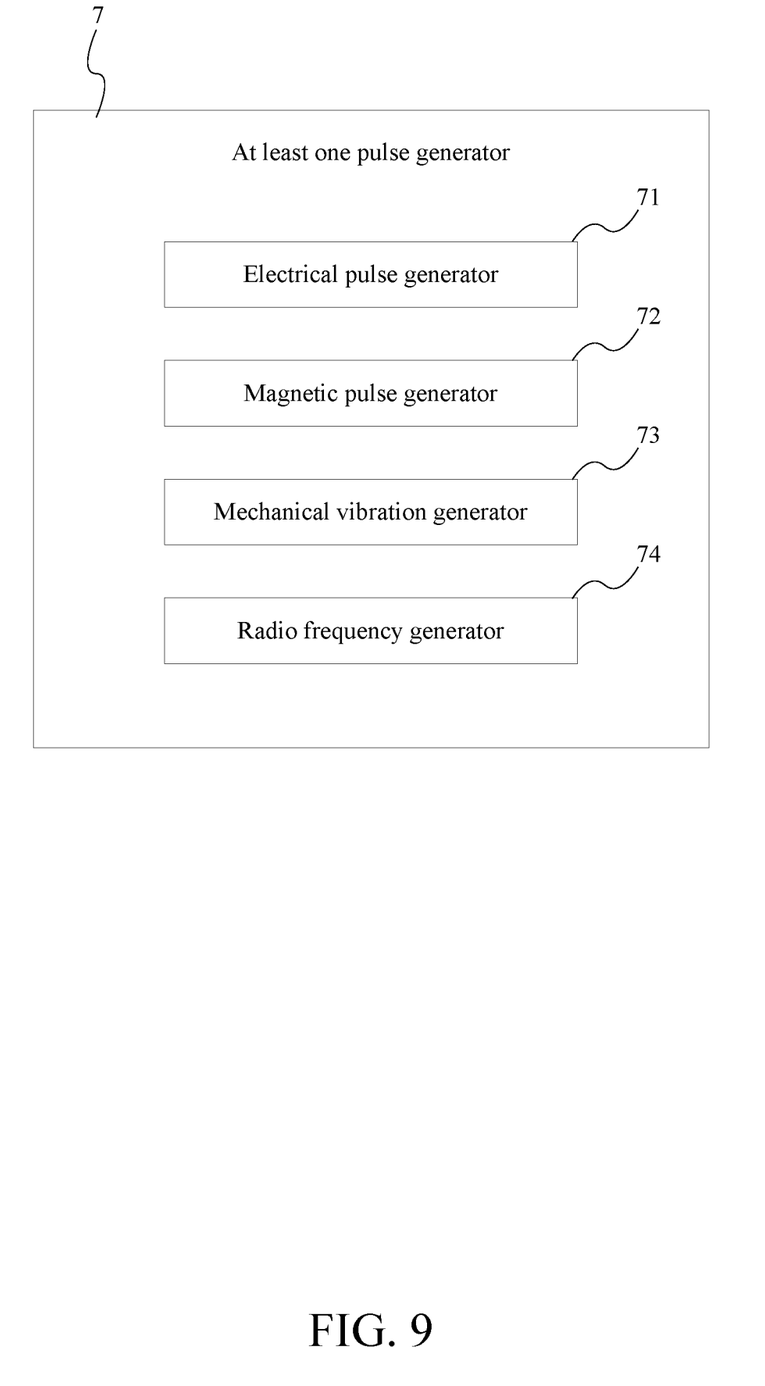
FIG. 9 is a depiction of possible types of pulse generators to be utilized in the present invention.

Referring to FIG. 9, as previously discussed, the at least one pulse generator 7 may comprise a variety of types and means of pulse generation, signal generation or other effect production required to create the personal protective field. In one embodiment, the at least one pulse generator 7 comprises an electrical pulse generator 71, wherein the carrier signal of the electrical pulse generator 71 is an electrical signal. The at least one pulse generator 7 may alternatively or additionally produce other types of electrical signals, pulses, fields, currents, or other electrical phenomena in order to create or contribute to the personal protective field.

It should be understood that the terms pulse, field, signal, and effect may generally be used interchangeably in the current disclosure where applicable to describe various effects produced in order to create the personal protective field.

In one embodiment, the at least one pulse generator 7 comprises a magnetic pulse generator 72, wherein the carrier signal of the magnetic pulse generator 72 is a magnetic field. In one embodiment, the at least one pulse generator 7 comprises a mechanical vibration generator 73, wherein the carrier signal of the electrical pulse generator 71 is a mechanical vibration signal. The mechanical vibration signal may be, but is not limited to, sound waves produced by an electromechanical sound producing device. In one embodiment, the at least one pulse generator 7 comprises a radio frequency (RF) generator 74, wherein the carrier signal of the RF generator 74 is an RF signal. In one embodiment, the at least one pulse generator 7 comprises a radiation generator. Other various embodiments may utilize various other pulse, signal, or field generators not specifically disclosed herein in order to produce the personal protective field.

Most embodiments of the present invention will require electronic data processing and computation capabilities in order to combine and modulate the carrier signals in order to produce the personal protective field. One or more carrier signals, due to their nature, must be modulated to produce a very specific effect, such as, but not limited to, a specific frequency, amplitude, current, voltage, waveform, force, or other metric in order to adequately create the personal protective field. Furthermore, a feedback loop may be desirable in order to correctly modulate the carrier signal due to variations in the environment, the resistance of the user's skin, or other factors.

Figure 10:
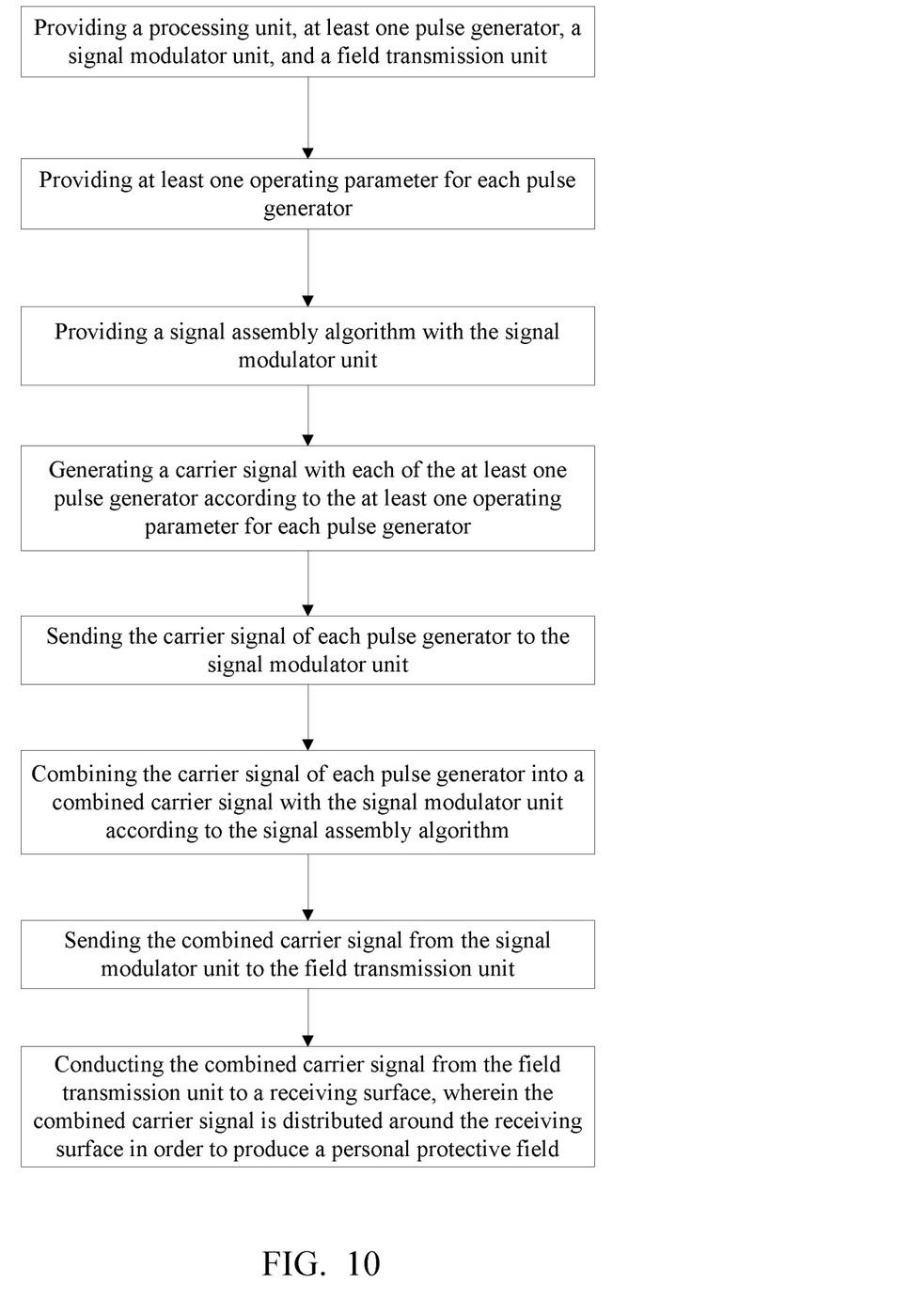
FIG. 10 is a stepwise flow diagram describing steps for operating the present invention.

Thus, as shown in FIG. 10, at least one operating parameter is provided for each pulse generator. The signal modulator unit 8 is further provided with a signal assembly algorithm. The carrier signal of each of the at least one pulse generator 7 is generated according to the at least one operating parameter for each pulse generator, and the carrier signal of each pulse generator is sent to the signal modulator unit 8. The carrier signal of each pulse generator is combined into a combined carrier signal with the signal modulator according to the signal assembly algorithm. The combined carrier signal is sent from the signal modulator unit 8 to the field transmission unit 9. The combined carrier signal is subsequently conducted from the field transmission unit 9 to a receiving surface such as the human skin of the user. The combined carrier signal is thus distributed around the receiving surface in order to produce the personal protective field.

Although the invention has been explained in relation to its preferred embodiment, it is to be understood that many other possible modifications and variations can be made without departing from the spirit and scope of the invention as hereinafter claimed.

What is claimed is:

1. A method of generating a personal protective field comprises the steps of:

providing a processing unit, at least one pulse generator, a signal modulator unit, and a field transmission unit;

providing at least one operating parameter for each pulse generator;

providing a signal assembly algorithm with the signal modulator unit;

generating a carrier signal with each of the at least one pulse generator according to the at least one operating parameter for each pulse generator;

sending the carrier signal of each pulse generator to the signal modulator unit;

combining the carrier signal of each pulse generator into a combined carrier signal with the signal modulator unit according to the signal assembly algorithm;

sending the combined carrier signal from the signal modulator unit to the field transmission unit; and conducting the combined carrier signal from the field transmission unit to a receiving surface, wherein the combined carrier signal is distributed around the receiving surface in order to produce a personal protective field.

\* \* \* \* \*